US009834208B2

(12) United States Patent
Yu

(10) Patent No.: US 9,834,208 B2
(45) Date of Patent: Dec. 5, 2017

(54) PARKING STEERING ASSIST SYSTEM AND METHOD FOR CORRECTING PARKING GUIDELINE

(71) Applicant: Hyundai Motor Company, Seoul (KR)

(72) Inventor: Keun Gyu Yu, Gunsan-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/925,940

(22) Filed: Oct. 28, 2015

(65) Prior Publication Data
US 2016/0046324 A1    Feb. 18, 2016
US 2017/0320489 A9    Nov. 9, 2017

(30) Foreign Application Priority Data

Jul. 20, 2015 (KR) .................. 10-2015-0102601

(51) Int. Cl.
*B60W 30/06* (2006.01)
*B60Q 9/00* (2006.01)
*B62D 15/02* (2006.01)

(52) U.S. Cl.
CPC ............. *B60W 30/06* (2013.01); *B60Q 9/002* (2013.01); *B62D 15/027* (2013.01); *B60W 2550/10* (2013.01)

(58) Field of Classification Search
CPC . B60W 30/06; B60W 2550/10; B62D 15/027; B60Q 9/002
See application file for complete search history.

(56) References Cited

U.S. PATENT DOCUMENTS

2009/0222229 A1*  9/2009  Kakinami ............... G01S 7/497
                                                       702/97

FOREIGN PATENT DOCUMENTS

| JP | 2004224178 | 8/2004 |
|---|---|---|
| JP | 2004-338637 | 12/2004 |
| JP | 2005067607 | 3/2005 |
| JP | 2014227021 | 12/2014 |
| KR | 20130035386 | 4/2013 |
| KR | 20130050681 A * | 5/2013 |
| KR | 20130106005 | 9/2013 |
| KR | 101451511 | 8/2014 |

* cited by examiner

Primary Examiner — Jerrah Edwards
Assistant Examiner — Kelly D Williams
(74) Attorney, Agent, or Firm — Brinks Gilson & Lione

(57) ABSTRACT

A parking steering assistance system is provided that calculates and provides a parking guide line applied with a tire dynamic radius value. The system includes an obstacle recognition unit configured to recognize an obstacle adjacent to a vehicle after parking is completed. A distance calculating unit is configured to calculate distance information between the obstacle and the vehicle, and a parking controller is configured to control a tire dynamic radius correction which is applied when calculating a parking guide line by using the distance information between the obstacle and the vehicle.

10 Claims, 6 Drawing Sheets

PARKING STEERING ASSIST SYSTEM AND METHOD FOR CORRECTING PARKING GUIDELINE

CROSS-REFERENCE TO RELATED APPLICATIONS

This application claims the benefit of Korean Patent Application No. 10-2015-0102601, filed on Jul. 20, 2015, the contents of which are incorporated herein by reference in their entirety.

FIELD

The present disclosure relates to a parking steering assist system and a method for correcting a parking guide line.

BACKGROUND

The statements in this section merely provide background information related to the present disclosure and may not constitute prior art.

As automotive technology makes great strides, various technologies for implementing the convenience of a driver have been developed. Among those technologies, a parking steering assist system that assists a parking of an unskilled driver is a system which searches a parking space through a video camera or an ultrasonic sensor and controls a steering system of a vehicle to park the vehicle on the searched parking space. When controlling the parking steering of a vehicle, a conventional parking steering assistance system searches an actual parking space and transmits information on basic parking environment related to parallel parking mode and perpendicular parking mode and information on transmission operation through at least one of a screen display unit and a sound output unit of the vehicle to a driver.

However, in the development of vehicles, the conventional parking steering assistance system calculates a parking guide line by applying a normal tire size. Further, after the development of the vehicle, even when the tire size is changed due to a tire tuning, the existing normal tire size is still used to calculate the parking guide line. Accordingly, there may be a concern if a discrepancy exists between a required parking guide line and a calculated parking guide line.

FIG. 1A illustrates an example of a good parking position when a parking guide line of a vehicle which is applied with a normal tire size is calculated after the development of a vehicle is completed. Meanwhile, FIG. 1B and FIG. 1C illustrate a problem of the parking position when the tire size is changed due to a tire tuning of the vehicle. FIG. 1B illustrates a case in which the vehicle is parked too close to a wall, when the tires of the vehicle are changed to tires having a larger size than the normal tire, which has a problem in that a Smart Parking Assistant System (SPAS) is stopped or the number of steps of moving forward or backward is increased. FIG. 1C illustrates a problem that the vehicle is parked too far from the wall, when the tires of the vehicle are changed to tires having a smaller size than the normal tire.

SUMMARY

The present disclosure provides a parking steering assist system and a method for correcting a parking guide line capable of calculating an improved parking guide line by applying a correction value for a deviated distance by tracing a distance between a wall and an actual parking location even if a tire size is changed due to a tuning of a vehicle tire.

In accordance with an aspect of the present disclosure, a parking steering assistance system for calculating and providing a parking guide line applied with a tire dynamic radius value, includes: an obstacle recognition unit configured to recognize an obstacle adjacent to a vehicle after parking is completed; a distance calculating unit configured to calculate distance information between the obstacle and the vehicle; and a parking controller configured to control a tire dynamic radius correction which is applied when calculating a parking guide line by using the distance information between the obstacle and the vehicle. The system further includes a storage unit configured to store accumulatively the distance information between the obstacle and the vehicle, and store at least one of a normal tire dynamic radius value, an improved distance value between the obstacle and the vehicle, a preset reference value, and a tire dynamic radius value correction table which stores a corrected tire dynamic radius value according to a difference between an average of the distance value between the obstacle and the vehicle and the improved distance value. The parking controller calculates an average value of the accumulated distance information between the obstacle and the vehicle, also calculates a difference between the average value and the improved distance value, and changes and stores the tire dynamic radius value when the difference between the average value and the improved distance value exceeds the preset reference value. The parking controller changes the tire dynamic radius value by using the tire dynamic radius value correction table. The parking controller controls not to calculate the distance information by the distance calculating unit, when the obstacle is not recognized by the obstacle recognition unit or the distance information exceeds a preset value.

In accordance with another form of the present disclosure, a method of correcting a parking guide line in a parking steering assistance system, includes: calculating the parking guide line by using a tire dynamic radius value; calculating distance information between an obstacle adjacent to a vehicle and the vehicle when parking is completed according to the parking guide line; and controlling a tire dynamic radius correction which is applied when calculating the parking guide line by using the distance information between the obstacle and the vehicle. The method further includes determining whether an obstacle adjacent to the vehicle exists, after the parking is completed. Calculating distance information between an obstacle adjacent to a vehicle and the vehicle includes not storing the distance information between the obstacle and the vehicle, when the obstacle does not exist, or the distance information between the obstacle and the vehicle exceeds a preset value. Calculating distance information between an obstacle adjacent to a vehicle and the vehicle includes storing accumulatively the distance information between the obstacle and the vehicle whenever the distance information between the obstacle and the vehicle is calculated. Controlling a tire dynamic radius correction includes: calculating an average value of the accumulated and stored distance information between the obstacle and the vehicle; calculating a difference between the average value and a preset improved distance value between the obstacle and the vehicle; comparing the difference and a preset reference value; and changing and storing the tire dynamic radius value of the vehicle when the difference is greater than the preset reference value. Changing and storing the tire dynamic radius value of the vehicle includes changing the tire dynamic radius value of the vehicle by using a tire dynamic radius value correction table including a pre-stored corrected tire dynamic radius value for each of the difference.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1A:
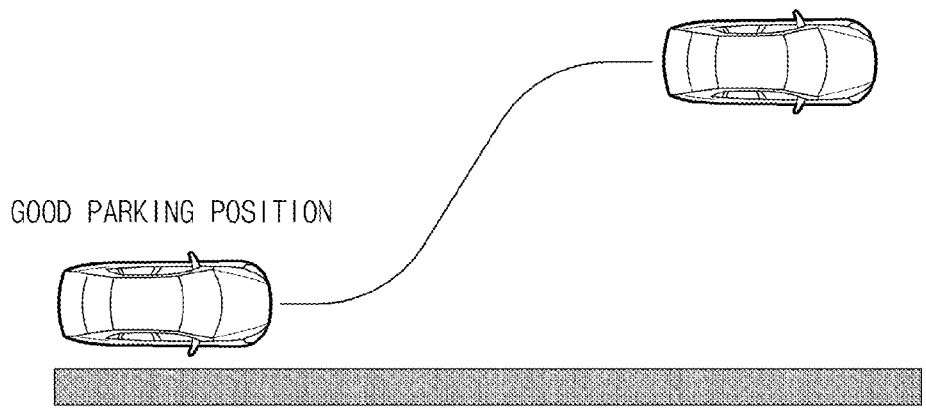
FIG. 1A is a diagram illustrating an example of parking by calculating a parking guide line when a normal tire is used.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, referring to FIG. 2 to FIG. 4, forms of the present disclosure are described in detail.

Figure 2:
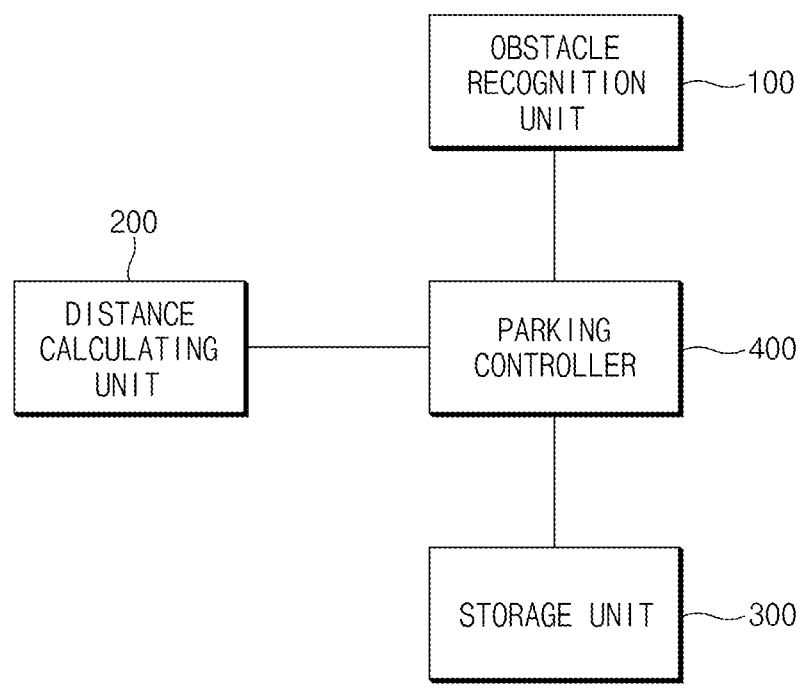
FIG. 2 is a block diagram illustrating a configuration of a parking steering assistance system according to one form of the present disclosure.

FIG. 2 is a block diagram illustrating a configuration of a parking steering assistance system according to one form of the present disclosure.

The parking steering assistance system according to one form of the present disclosure may include an obstacle recognition unit 100, a distance calculating unit 200, a storage unit 300, and a parking controller 400.

The obstacle recognition unit 100 may recognize obstacles adjacent to a vehicle when parking the vehicle and determine whether the obstacle is a wall, a curb or other vehicle.

The distance calculating unit 200 may calculate distance information between the parked vehicle and the obstacle to store in the storage unit 300.

The storage unit 300 may store a normal tire dynamic radius value (T), an improved distance value (A) of a distance between the obstacle and a vehicle, a reference value (Z), and a tire dynamic radius value correction table. The tire dynamic radius value correction table is a table which stores a corrected tire dynamic radius value (Tc) for each of a difference between an average (E) of N times of a distance between the obstacle and the vehicle and the improved distance value (A).

The parking controller 400 may determine whether the parking of the vehicle is completed, and determine whether an obstacle adjacent to the vehicle exists when the parking of the vehicle is completed. In addition, the parking controller 400 may calculate an average value (E) of a distance value when distance information, between the vehicle and the adjacent obstacle, which is calculated by the distance calculating unit 200 at every parking, is accumulated N times or more.

In this case, in association with the obstacle recognition unit 100, when it is determined that an obstacle does not exist, or, in association with the distance calculating unit 200, when it is determined that a difference value between the improved distance value (A) stored in the storage unit 300 and the calculated distance information exceeds a certain value, the parking controller 400 may determine that the parking is accomplished in a place where an obstacle does not exist, and may not perform the tracing of distance, for example, may not store the calculated distance information in the storage unit 300.

In addition, the parking controller 400 may calculate a difference between the average value (E) of the distance and the improved distance value (A), and may compare the difference between the average value (E) of the distance and the improved distance value (A) with the reference value (Z). That is, when the difference between the average value (E) of the distance and the improved distance value (A) is the reference value (Z) or less, the parking controller 400 may not change the tire dynamic radius value stored in the storage unit 300. Further, when the difference between the average value (E) of the distance and the improved distance value (A) is greater than the reference value (Z), the parking controller 400 may change the tire dynamic radius value stored in the storage unit 300 into the corrected tire dynamic radius value.

In this case, the parking controller 400 may change the tire dynamic radius value into the corrected tire dynamic radius value by using a tire dynamic radius value correction table which is previously stored in the storage unit 300. At this time, the tire dynamic radius value correction table is shown in Table 1 below.

TABLE 1

| Average value (E) of distance information - Improved distance value (A) | −30~−20 | −20~−10 | −10~10 | 10~20 | 20~30 |
|---|---|---|---|---|---|
| Corrected tire dynamic radius value (Tc) | 60 cm | 55 cm | 50 cm | 45 cm | 40 cm |

Referring to Table 1, an example of correcting the parking guide line according to the change of tire dynamic radius value is described in detail.

It is assumed that the improved distance value (A) which is previously stored in the storage unit 300 is 15 cm, the normal tire dynamic radius value (T) is 50 cm, the reference value (Z) is 10 cm, and the tire dynamic radius value correction table is shown in Table 1.

When the average value (E) of distance information of distance value (X1, X2 . . . Xn) between the obstacle and the vehicle, which is calculated N times or more and stored, is 30 cm, the difference value between the average value (E) of distance information and the improved distance value (A) becomes 30-15, that is, 15. Since the difference value, which is 15, between the average value (E) of distance information and the improved distance value (A) is greater than the reference value (Z) which is 10, the parking controller 400 may determine that the tire dynamic radius value is changed due to a wheel exchange, a decrease of tire pressure, or the like, and change the tire dynamic radius value into the corrected tire dynamic radius value (Tc) of 45 cm corresponding to a range 10 to 20 to which the difference value, which is 15, between the average value (E) of distance information and the improved distance value (A) belongs, in the tire dynamic radius value correction table of Table 1. Accordingly, the parking controller 400 may prevent a parking error by applying the corrected tire dynamic radius value (Tc) of 45 cm when calculating the parking guide line later.

As described above, in order to change the tire dynamic radius value, the corrected tire dynamic radius value may be changed by using the tire dynamic radius value correction table using the distance information between the obstacle and the vehicle after the parking is completed.

Figure 1B:
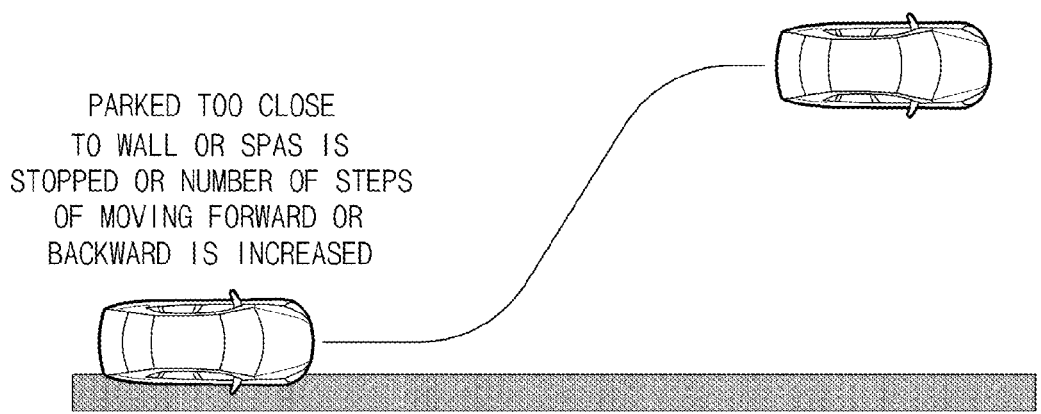
FIG. 1B is a diagram illustrating an example of parking by calculating a parking guide line when a tire having a larger size than a normal tire is used.
Figure 1C:
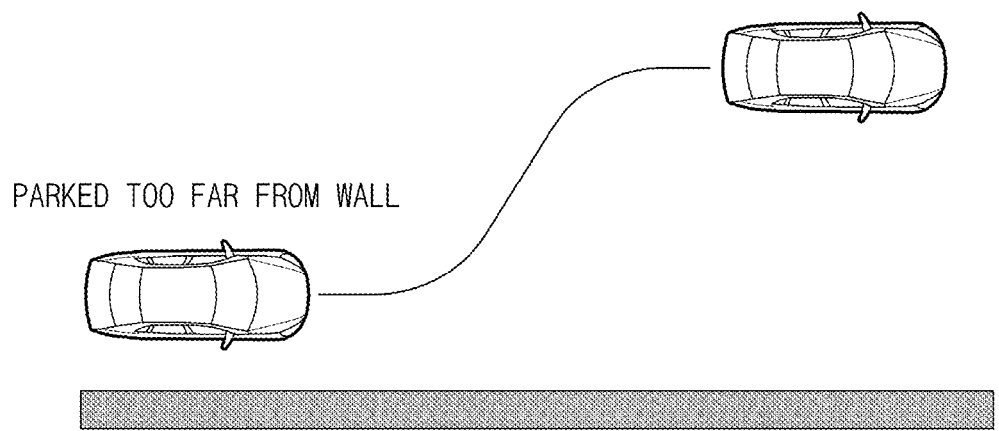
FIG. 1C is a diagram illustrating an example of parking by calculating a parking guide line when a tire having a smaller size than a normal tire is used.

As another method of changing the tire dynamic radius value, there is a method of calculating a tire dynamic radius value using a lateral movement distance and the number of revolutions of a tire. That is, the tire dynamic radius value may be calculated by the lateral movement distance on a control path of the parking steering assistance system and the number of revolutions of a tire for the lateral movement distance. For example, on the assumption that the number of revolutions of a tire is increased when the tire size is decreased and the number of revolutions of a tire is decreased when the tire size is increased, a tire dynamic radius value correction table which stores a corrected tire dynamic radius value according to the number of revolutions of a tire may be previously stored as shown in FIG. 1 to correct the tire dynamic radius value according to the number of revolutions of a tire.

Thus, when the tire dynamic radius value (T) stored in the storage unit 300 is changed and stored into the corrected tire dynamic radius value (Tc), the parking controller 400 may calculate the parking guide line again by using the changed tire dynamic radius value (Tc) to correct the current parking, or may provide a parking guide line based on a new tire dynamic radius value in the next parking.

Figure 3:
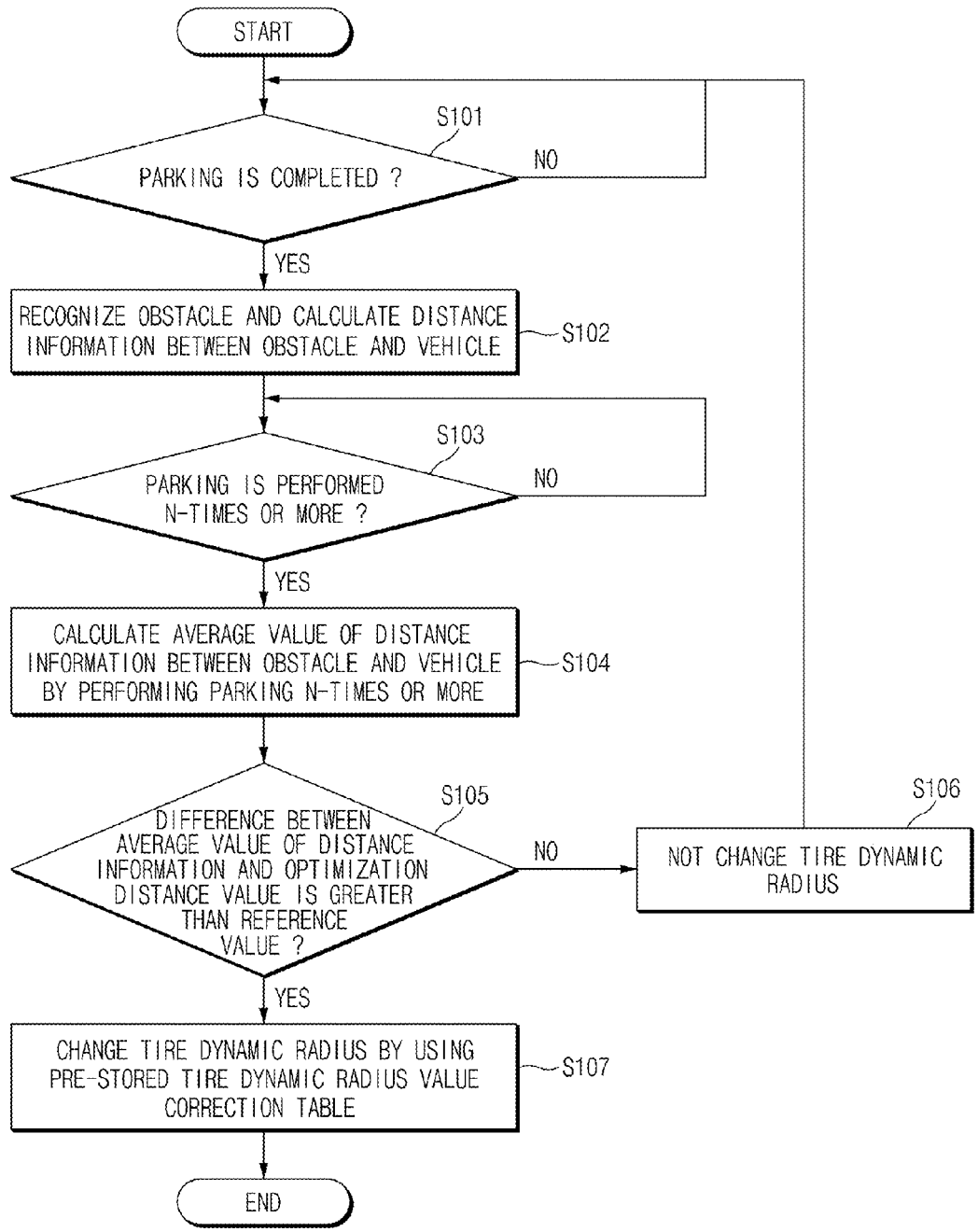
FIG. 3 is a flowchart illustrating a method for correcting a parking guide line of a parking steering assistance system according to one form of the present disclosure.

Referring to FIG. 3, the method for correcting a parking guide line of a parking steering assistance system according to one form of the present disclosure is described in detail.

Firstly, the storage unit 300 may store a normal tire dynamic radius value (T), an improved distance value (A) of a distance between an obstacle and a vehicle, a reference value (Z), and a tire dynamic radius value correction table.

The parking controller 400 may determine whether parking is completed when the vehicle is parked (S101). The parking controller 400 may determine whether an obstacle adjacent to the vehicle is a curb, a wall, another vehicle, or the like after the parking is completed, and calculate and store distance information between the obstacle and the vehicle (S102).

Then, the parking controller 400 may perform the parking N-times or more and determine whether the distance information between the obstacle and the vehicle is stored N-times or more (S103). When the distance information (X1, X2, X3 . . . Xn) is stored by performing the parking N-times or more, the parking controller 400 may calculate an average value of the distance information (X1, X2, X3 . . . Xn) between the obstacle and the vehicle obtained by performing the parking N-times or more (S104).

Then, the parking controller 400 may calculate a difference between the average value of distance information and the improved distance value, and may compare the difference between the average value of distance information and the improved distance value with the reference value which is previously stored in the storage unit 300 (S105).

When the difference between the average value of distance information and the improved distance value is the reference value or less, the parking controller 400 may determine that the tire dynamic radius is not changed and may control not to change the tire dynamic radius value stored in the storage unit 300 (S106).

On the other hand, when the difference between the average value of distance information and the improved distance value is greater than the reference value, the parking controller 400 may correct (change) the tire dynamic radius by using the tire dynamic radius value correction table which is previously stored in the storage unit 300 (S107).

Thus, the tire dynamic radius value (T) stored in the storage unit 300 is changed into the corrected tire dynamic radius value (Tc) and stored, and the parking controller 400 may follow the parking guide line by using the changed tire dynamic radius value (Tc).

Figure 4:
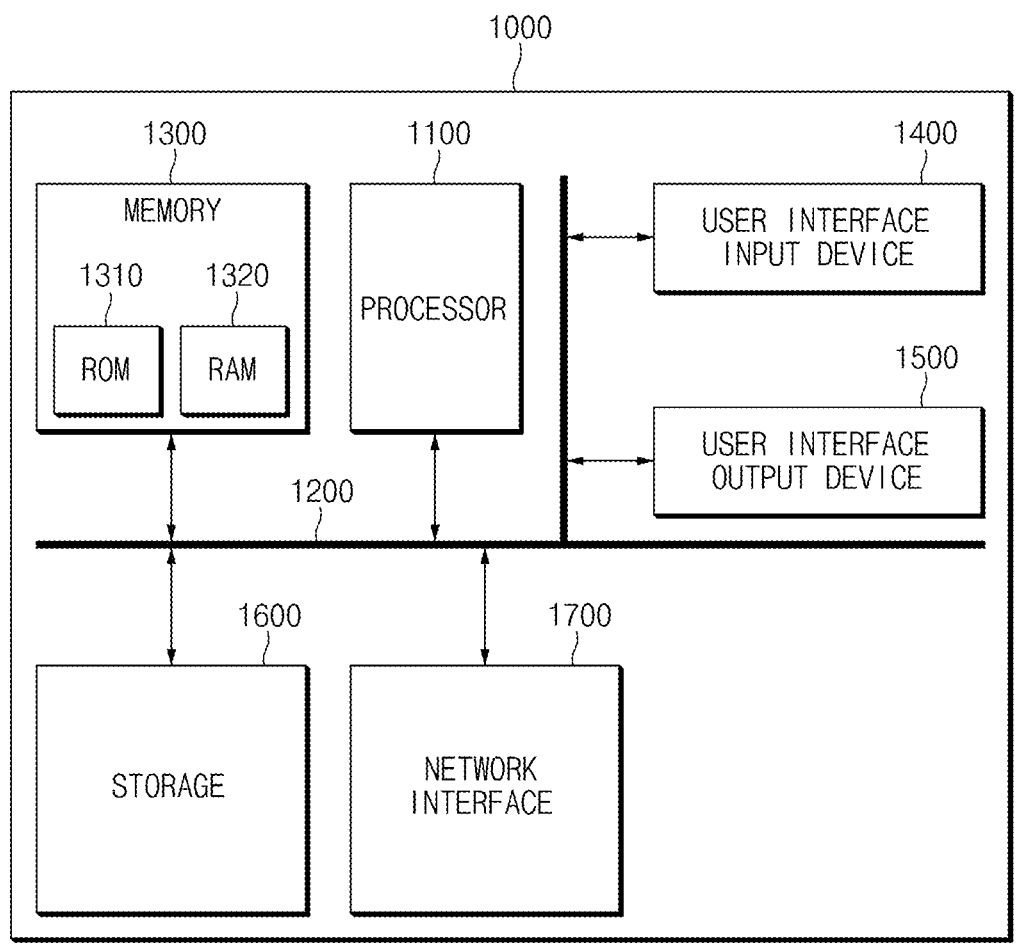
FIG. 4 is a block diagram illustrating an example of a configuration of a computing system 1000 applied with a parking guide line automatic correction logic according to one form of the present disclosure.

FIG. 4 is a block diagram illustrating an example of a configuration of a computing system 1000 applied with a parking guide line automatic correction logic according to a form of the present disclosure, and the computing system 1000 may be mounted in a vehicle. Referring to FIG. 4, the computing system 1000 may include at least one processor 1100 which is connected via a bus 1200, a memory 1300, a user interface input device 1400, a user interface output device 1500, a storage 1600, and a network interface 1700.

The processor 1100 may be a semiconductor device to execute processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) and a Random Access Memory (RAM).

Accordingly, the method or algorithm step which is mentioned in association with the forms disclosed in this specification may be directly implemented by a hardware, a software module, or a combination of the two executed by a processor 1110. The software module may reside in a storage medium, that is, in a memory 1300 and/or a storage 1600 such as a RAM memory, a flash memory, a ROM memory, an EPROM memory, an EEPROM memory, a register, a hard disk, a removable disk, and CD-ROM. The exemplary storage medium may be coupled to a processor 1100, and the processor 1100 may read information from the storage medium and write information to the storage medium. Alternatively, the storage medium may be integrated in the processor. The processor and the storage medium may reside in an application specific integrated circuit (ASIC). The ASIC may reside in a user terminal. Alternatively, the processor and the storage medium may reside in the user terminal as an individual component.

This technology may adjust the parking guide line automatically by tracing the distance to a wall or a curb after completing a parking even when the tire of the vehicle is changed, thereby improving the parking performance of the parking steering assistance system.

In addition, this technology may improve the marketability as the choice of a wheel and a tire of a consumer may be widened.

Although forms of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. A parking steering assistance system for calculating and providing a parking guide line applied with a tire dynamic radius value, the system comprising:
    an obstacle recognition computing system comprising:
        a light or sound-based sensor configured to sense an obstacle;
    a parking controller configured to:
        determine parking of a vehicle is completed;
        recognize the obstacle is positioned adjacent to the vehicle after parking is determined to be completed;
        determine distance information including a distance between the obstacle and the vehicle after parking is determined to be completed;
        determine a tire dynamic radius value based on the distance information;
        accumulate the distance information determined for every parking of the vehicle;
        calculate an average value of the accumulated distance information;
        calculate a difference between the average value and an improved distance value; and
        determine a corrected tire dynamic radius value that corrects the tire dynamic radius value based on the difference between the average value and the improved distance value.

2. The system of claim 1, further comprising a memory configured to store accumulatively the distance information between the obstacle and the vehicle, and store at least one of a normal tire dynamic radius value, a distance value between the obstacle and the vehicle, a preset reference value, and a tire dynamic radius value correction table which stores the corrected tire dynamic radius value according to a difference between an average of the improved distance value between the obstacle and the vehicle and the improved distance value.

3. The system of claim 2, wherein the parking controller is further configured to store the tire dynamic radius value when the difference between the average value and the improved distance value exceeds the preset reference value.

4. The system of claim 3, wherein the parking controller determines the corrected tire dynamic radius value by using the tire dynamic radius value correction table.

5. The system of claim 3, wherein the parking controller controls not to calculate the distance information by the parking controller, when the obstacle is not recognized by the obstacle recognition computing system or the distance information exceeds a preset value.

6. A method of correcting a parking guide line in a parking steering assistance system of a vehicle including a parking controller, the method comprising:
    calculating, by the parking controller, the parking guide line by using a tire dynamic radius value;
    sensing, by a light or sound-based sensor, an obstacle;
    determining, by the parking controller, parking of the vehicle is completed;
    recognizing, by the parking controller, the obstacle is positioned adjacent to the vehicle after parking is determined to be completed;
    determining, by the parking controller, distance information including a distance between the obstacle and the vehicle after parking is determined to be completed;
    controlling, by the parking controller, a tire dynamic radius correction by using the distance information between the obstacle and the vehicle,
    wherein controlling, by the parking controller, the tire dynamic radius correction comprises:
        accumulating the distance information measuring a distance between the obstacle and the vehicle determined for every parking of the vehicle;
        calculating an average value of the accumulated distance information;
        calculating a difference between the average value and a preset improved distance value measuring a distance between the obstacle and the vehicle;
        correcting the tire dynamic radius based on the difference between the average value and the preset improved distance value.

7. The method of claim 6, wherein calculating the distance information between the obstacle and the vehicle comprises not storing the distance information between the obstacle and the vehicle, when the obstacle does not exist, or when the distance information between the obstacle and the vehicle exceeds a preset value.

8. The method of claim 6, wherein calculating the distance information between an obstacle adjacent to a vehicle and the vehicle comprises storing accumulatively the distance information between the obstacle and the vehicle whenever the distance information between the obstacle and the vehicle is calculated.

9. The method of claim 8, wherein controlling the tire dynamic radius correction comprises:
    storing the tire dynamic radius value of the vehicle when the difference is greater than the preset reference value.

10. The method of claim 9, wherein changing and storing the tire dynamic radius value of the vehicle comprises changing the tire dynamic radius value of the vehicle by using a tire dynamic radius value correction table including a pre-stored corrected tire dynamic radius value for each of the difference.

* * * * *